United States Patent
Han et al.

(10) Patent No.: US 9,744,992 B2
(45) Date of Patent: Aug. 29, 2017

(54) FAULT TOLERANT APPARATUS FOR AN INDEPENDENT CONTROLLED STEERING IN A FOUR WHEEL SYSTEM

(71) Applicant: Kyungpook National University Industry-Academic Cooperation Foundation, Buk-gu, Daegu (KR)

(72) Inventors: Dong Seog Han, Daegu (KR); In Seok Yang, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days.

(21) Appl. No.: 14/788,143

(22) Filed: Jun. 30, 2015

(65) Prior Publication Data

US 2016/0016582 A1    Jan. 21, 2016

(30) Foreign Application Priority Data

Jul. 1, 2014    (KR) ........................ 10-2014-0082122

(51) Int. Cl.
  *B62D 7/15*    (2006.01)
  *B62D 5/00*    (2006.01)
  *B62D 6/02*    (2006.01)
  *B62D 6/00*    (2006.01)

(52) U.S. Cl.
  CPC ............. *B62D 7/159* (2013.01); *B62D 5/001* (2013.01); *B62D 5/003* (2013.01); *B62D 6/002* (2013.01)

(58) Field of Classification Search
  CPC ......... B62D 7/159; B62D 5/003; B62D 5/002

USPC ........................................... 701/41
See application file for complete search history.

(56) References Cited

U.S. PATENT DOCUMENTS

| | | | |
|---|---|---|---|
| 6,929,086 B1* | 8/2005 | Husain | B62D 5/003 180/402 |
| 2004/0129491 A1* | 7/2004 | Bean | B60B 35/003 180/411 |
| 2007/0021875 A1* | 1/2007 | Naik | B60K 17/356 701/1 |
| 2014/0145498 A1* | 5/2014 | Yamakado | B60T 8/1755 303/3 |

(Continued)

FOREIGN PATENT DOCUMENTS

JP    2009184575 A * 8/2009

OTHER PUBLICATIONS

NPL EPO english translation of jp2009184575a.*

*Primary Examiner* — Yazan Soofi
(74) *Attorney, Agent, or Firm* — Blakely Sokoloff Taylor & Zafman LLP

(57) ABSTRACT

The following description relates to a fault tolerant apparatus for an independent controlled steering in a four wheel system, particularly a fault tolerant apparatus for an independent controlled steering in a four wheel system which can stabilizes a vehicle body through actively adjusting a steering angle of a vehicle and a velocity of a vehicle according to a breakdown environment and a vehicle driving road environment. Further, a fault tolerant apparatus for an independent controlled steering in a four wheel system that may assist a safe driving environment by adjusting a turning function adoptively to a surrounding road environment.

8 Claims, 13 Drawing Sheets

(56) References Cited

U.S. PATENT DOCUMENTS

2015/0120145 A1* 4/2015 Han ................. B62D 7/148
701/43

* cited by examiner

FAULT TOLERANT APPARATUS FOR AN INDEPENDENT CONTROLLED STEERING IN A FOUR WHEEL SYSTEM

CROSS-REFERENCE TO RELATED APPLICATION(S)

This application claims the benefit under 35 USC 119(a) of Korean Patent Application No. 10-2014-0082122 filed on Jul. 1, 2014 in the Korean Intellectual Property Office, the entire disclosure of which is incorporated herein by reference for all purposes.

BACKGROUND

1. Field

The following description relates to a fault tolerant apparatus for an independent controlled steering in a four wheel system, particularly a fault tolerant apparatus for an independent controlled steering in a four wheel system which can stabilizes a vehicle body through actively adjusting a steering angle of a vehicle and a velocity of a vehicle according to a breakdown environment and a vehicle driving road environment. Further, a fault tolerant apparatus for an independent controlled steering in a four wheel system that may assist a safe driving environment by adjusting a turning function adoptively to a surrounding road environment.

2. Description of Related Art

In general, four wheel drive vehicles are designed such that the inscribed circles of the steering angles of the wheels make coaxial circles in turning so that the turning radii of the wheels keep constant. However, when one or more steering systems for the wheels break, the centers of the inscribed circles of the steering angles cannot converge on one point, such that large stress is applied transversely to the vehicles that are rigid bodies; therefore, the structural safety of the vehicles is considerably deteriorated and it exerts critical influence on the safety of the driver in the vehicles.

Accordingly, studies about the technology of efficient steering control of a four wheel drive vehicles which can improve structural safety of a vehicle and contribute to the safety of a driver have been conducted.

Patent Document 1 relates to an electric steering system for a vehicle, disclosing a technology of allowing stable steering by using the existing devices or components when there is a fault in a steering-driving motor in the steering system.

In detail, there is disclosed in Patent Document 1 a technology of controlling the braking force from brake systems to have a calculated value by sensing a fault in a steering-driving motor from the relationship between the amounts of input and output currents of the steering-driving motor and the rack displacement of the turning angle of a steering wheel, using a steering-driving motor sensing unit, and by calculating the braking force of the brake systems for the wheel such that the traveling direction of a vehicle changes in proportion to the turning direction and angle of the steering wheel, when there is a fault in the steering-driving motor.

Patent Document 2 discloses a technology that calculates torsion calculated from a steering angle detected by a steering angle sensor and the torque of a motor, calculates the difference between the equivalent steering angular speed and the steering angular speed of the motor including the torsion with reference to the torsion, and turns off the power, when the difference exceeds a threshold value.

In detail, in Patent Document 2, there is disclosed a technology that compensates for an error generated due to a torsional effect by calculating the correct equivalent steering angular speed including the torsional effect in response to a signal from a motor, using an ECU included in a fault sensing unit in a steering system, and increase safety in driving by turning off the power, when the difference between the equivalent steering angular speed and the steering angular speed exceeds a threshold value, that is, only when a problem is actually generated.

However, Patent Documents 1 and 2 disclose only the technology of controlling the turning direction and angle through braking, when there is a fault in a steering system, such that the turning radius of a vehicle cannot be controlled at the same time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples overcome the above disadvantages and other disadvantages not described above. Also, the examples are not required to overcome the disadvantages described above, and an example potentially does not overcome any of the problems described above.

The present disclosure provides a fault tolerant apparatus for an independent controlled steering in a four wheel system which not only can assist safe driving environment by actively adjusting the steering angles of wheels, which normally work, and the speed of the vehicle in accordance with the surrounding road environment, but also can stabilize the vehicle body also in a fault environment.

Further, the present disclosure provides a fault tolerant apparatus for an independent controlled steering in a four wheel system which can provide a vehicle route based on a route that a current vehicle can adoptively drive in a fault environment.

In a general aspect, there is provided a fault tolerant apparatus for an independent controlled steering in a four wheel steering system, which includes: a steering system unit that is disposed at four wheels of a vehicle, controls steering of the wheels, and collects and transmits the state information of the wheels; and a control unit that controls the turning radii of a vehicle in accordance with the state information transmitted from the steering system unit.

The control unit can control a turning radius of the vehicle by controlling a steering angle of a vehicle with no fault generated and a speed of a vehicle when a fault information in included in a state information transmitted by the steering system unit.

The control unit may include a turning radius determining unit that determines a proper turning radius of the vehicle, when a fault information is included in a state information that is transmitted by the steering system unit; a turning center coordinate calculating unit that calculates turning center coordinates such that the tangential lines of all of the wheels converge on one point and the turning radii when a fault is generated are maintained, when fault information is included in the state information transmitted from the steering system unit; a speed calculating unit that calculates a speed for keeping the turning radius when a fault is generated on the basis of the turning center coordinates calculated by the turning center coordinate calculating unit; a steering angle calculating unit that calculates the steering angles of steering systems without a fault on the basis of the turning center coordinates calculated by the turning center coordinate calculating unit; and a speed/steering angel control unit that controls the steering angle and the speed of the vehicle by transmitting the steering angles calculated by the steering angle calculating unit to the steering systems without a fault and transmitting the speed calculated by the speed calculating unit to an engine control unit.

The control unit may control the turning radius while maintaining the vehicle speed over a threshold.

The vehicle further includes a maximum turning radius information acquiring unit that acquires a maximum turning radius of the vehicle driving road, and the control unit may control the turning radius of the vehicle under the maximum turning radius.

The vehicle further includes a proper turning radius information acquiring unit that acquires a proper turning radius regarding the vehicle driving road, and the control unit may control the vehicle turning radius with the proper turning radius.

The control unit may further include a maximum turning radius acquiring unit that acquires a maximum turning radius for at least one route to a certain destination; and a driving route determining unit that determines a driving route to a certain destination by comparing a maximum turning radius value that may be controlled by the control unit with a maximum turning radius of respective routes.

The maximum turning radius acquiring unit may include a candidate route determining unit that determines at least one route to a certain destination based on a current vehicle location information, and a maximum turning radius acquiring unit for each routes that acquires a maximum turning radius for each routes using a maximum turning radius value of at least one road that is included in respective routes that is acquired from an specific road information database.

The control unit may be formed with an Electronic Control Unit (ECU) or an specific independent module.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

Figure 1:
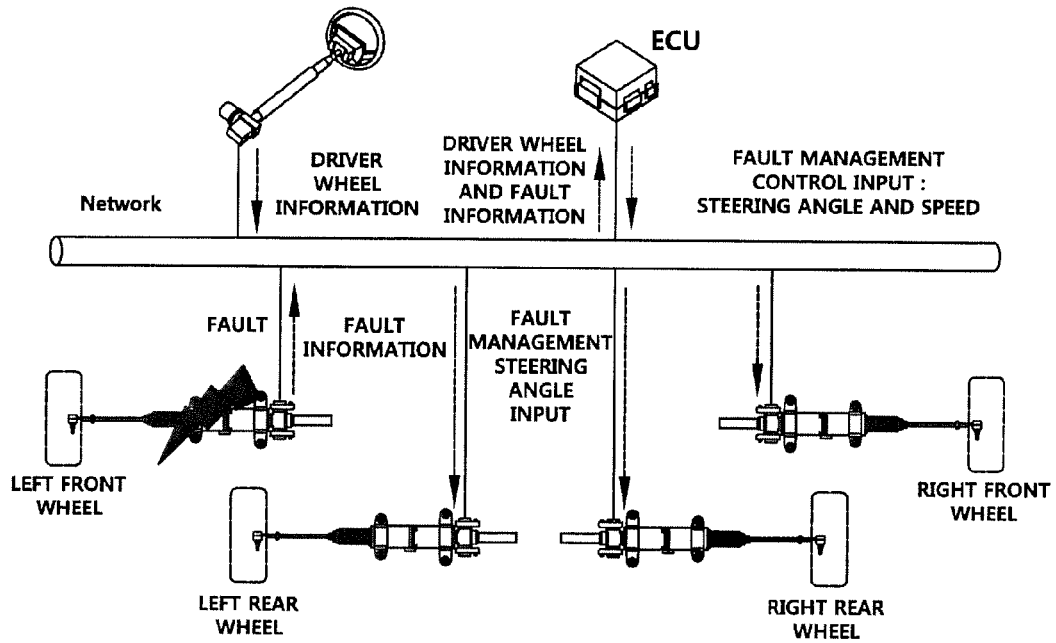
FIG. 1 is a conceptual view of a system where the fault management technology of an independently controlled steering system in a four wheel system according to the present disclosure is used.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Certain examples are now described in greater detail with reference to the accompanying drawings.

In the following description, the same drawing reference numerals are used for the same elements, even in different drawings. The matters defined in the description, such as detailed constructions of terms and elements, are provided to assist in a comprehensive understanding of the present examples. Accordingly, it is apparent that it is possible for the examples to be carried out without those specifically defined matters. Also, well-known functions or constructions are not described in detail to avoid obscuring the examples with unnecessary detail.

While the expressions such as "first" or "second" are potentially used to refer to various elements, the elements are not intended to be limited by the expressions. Such expressions are used only for the purpose of distinguishing one element from the other when referring to such elements.

The expressions presented are used herein only for the purpose of explaining specific examples and are not intended to place limits on the present examples. An expression in singular form also encompasses plural meaning, unless otherwise specified. Throughout the description, the expression "comprise" or "have" is used only to designate the existence of a characteristic, number, step, operation, element, component or a combination thereof which is described herein, but not to preclude possibility of existence of one or more of the other characteristics, numbers, steps, operations, elements, components or combinations of these or other appropriate additions.

Spatial words, such as below, beneath, lower, above and upper are used to conveniently recite a correlation between one element or features with respect to other elements or features, as illustrated in the drawings. When spatial terminology is used with a direction as illustrated in the drawing, if the illustrated element is upside down, the element that was recited as below and beneath is also potentially considered to be above or upper of another element. Thus, examples presented below include all such instances related to the directions of below and above. An element is also potentially aligned in another direction, and thereby spatial words are interpreted according to the alignment.

Hereinafter, embodiments of the present disclosure are described in detail with reference to the accompanying drawings.

FIG. 1 is a conceptual view of a system where the fault management technology of an independently controlled steering system in a four wheel system according to the present disclosure is used.

Referring to FIG. 1, according to the entire system, a steering system is disposed at four wheels, that is, the left front wheel, the right front wheel, the left rear wheel, and the right rear wheel and transmits state information including fault information generated in the wheels in real time to a control module such as an engine control unit through a network. Though will be described in detail, the control module controls the wheels such that the entire tangential lines of the wheels converge on a certain point (turning center coordinate) while controlling the turning radii of a vehicle on the basis of the state information transmitted from the steering systems and a surrounding road environment information that is acquired specifically.

Figure 2:
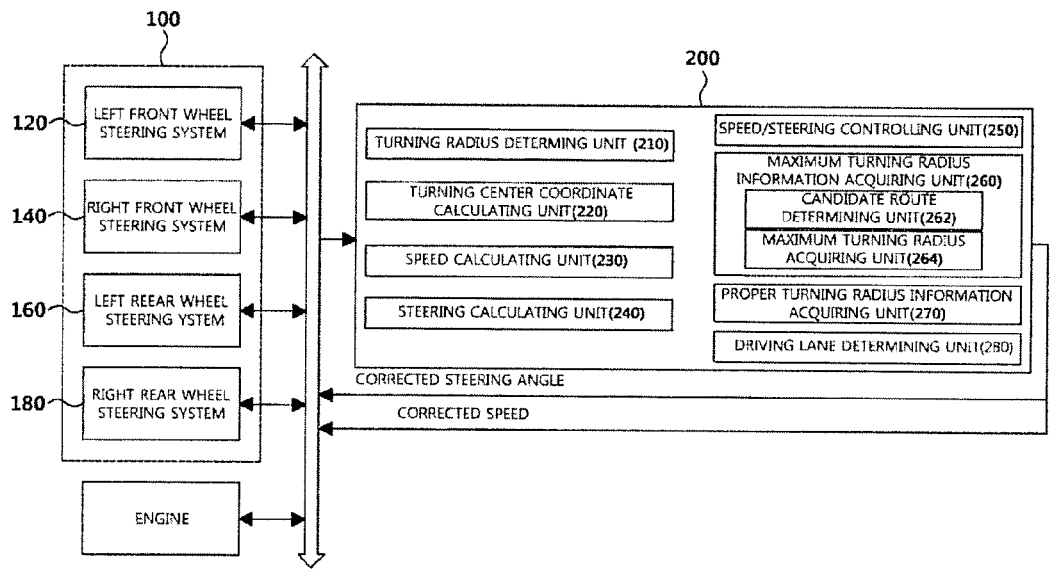
FIG. 2 is a diagram illustrating a fault management apparatus for an independently controlled steering control system in a four wheel system according to an embodiment of the present disclosure.

FIG. 2 is a diagram illustrating a fault management apparatus for an independently controlled steering control system in a four wheel system according to an embodiment of the present disclosure.

Referring to FIG. 2, the fault management apparatus for an independently controlled steering system in a four wheel drive system according to an embodiment of the present disclosure includes a steering system unit 100 and a control unit 200.

The steering system unit 100 is disposed at four wheels of a vehicle, controls steering of the wheels and collects and transmits the state information of the wheels. Further, when any one of steering systems in the steering system unit 100 breaks, the steering system transmits fault information to the control unit 200 and the steering systems without a fault receive corrected steering angles calculated by the control unit 200 and speed information, thereby control the steering angle of their wheels.

The control unit 200 controls the steering system unit 100 in accordance with the state information transmitted from the steering system unit 100. The control unit 200 may be an ECU (Engine Control Unit) or a specific module independent from an engine control unit.

For example, the control unit 200 may include a turning radius determining unit 210, a turning center coordinate calculating unit 220, a speed calculating unit 230, a steering calculating unit 240, a speed/steering angle controlling unit 250, a maximum turning angle information acquiring unit 260, a proper turning angle information acquiring unit 270, and a driving road determining unit 280.

The turning angle determining unit 210 determines a proper turning radius of the vehicle when fault information is included in a state information transmitted from the steering system unit 100. A proper turning radius of a vehicle is a turning radius of a vehicle that the vehicle can drive without giving pressure on a rigid body of the vehicle. A proper turning radius value herein may be applied with various values. For example, a maximum turning radius below value that is acquired through the maximum turning radius information acquiring unit 260 and a certain value that is acquired through a proper turning radius information acquiring unit 270.

The turning center coordinate calculating unit 220 calculates a turning center coordinate that maintains a proper turning radius that is determined by the turning radius determining unit 210 while converging the tangential lines of the entire wheels when a fault information is included in a state information transmitted by the steering system unit 100.

The turning center coordinate calculating unit 220 may calculate the turning center coordinates by calculating the intersection of the tangential line of the wheel with a fault and the circle with the turning radius when the fault is generated, as its radius.

The speed calculating unit 230 calculates a speed to maintain the proper turning radius according to a turning center coordinate that is calculated by the turning center coordinate calculating unit 220.

The steering angle calculating unit 240 calculates the steering angles of steering systems without a fault on the basis of the turning center coordinates calculated by the turning center coordinate calculating unit 220.

The speed/steering angel control unit 250 controls the steering angle and the speed of a vehicle by transmitting the steering angles calculated by the steering angle calculating unit 240 to the steering systems without a fault and transmitting the speed calculated by the speed calculating unit 230 to the engine control unit.

The maximum turning radius information acquiring unit 260 acquires the maximum turning radius of the certain road that the vehicle is driving. Further, the maximum turning radius information acquiring unit 260 acquires at least one maximum turning radius of each routes For this, the maximum turning radius information acquiring unit 260 may acquire the maximum turning radius information from a specific road information database (not shown). For example, the information may be acquired from a specific database disposed in a navigation and etc. and may be acquired from a specific server through a wired/wireless network if necessary.

The maximum turning radius information acquiring unit 260 may include a candidate route determining unit 262 and a maximum turning radius acquiring unit for each routes 265. When at least one or a plurality of candidate routes are determined by the candidate route determining unit 262, the maximum turning radius acquiring unit for each routes 265 may acquire the maximum turning radius value for each routes based on one or a plurality of maximum turning radius value for each roads that is included in each routes. For example, when the maximum turning radius value of roads included in route A is 10, 15, and 20, and when the maximum turning radius value of roads included in route B is 12, 13, and 15, the maximum turning radius acquiring unit 264 may acquire the maximum turning radius value of route A as 20 and the maximum turning radius value of route B as 15.

Similarly, the proper turning radius information acquiring unit 270 acquires the proper turning radius value of a road the vehicle is driving. The proper turning radius value may be acquired through a database that is specifically disposed like the method of acquiring the maximum turning radius information.

The driving route determining unit 280 may determine a driving route to a certain destination by comparing the maximum turning radius value for plurality of routes that is acquired through the maximum turning radius acquiring unit 260 and the maximum turning radius value that may be controlled by a control unit 200 of a vehicle. Hereinafter illustrates the afore-mentioned structure through FIG. 3.

Figure 3:
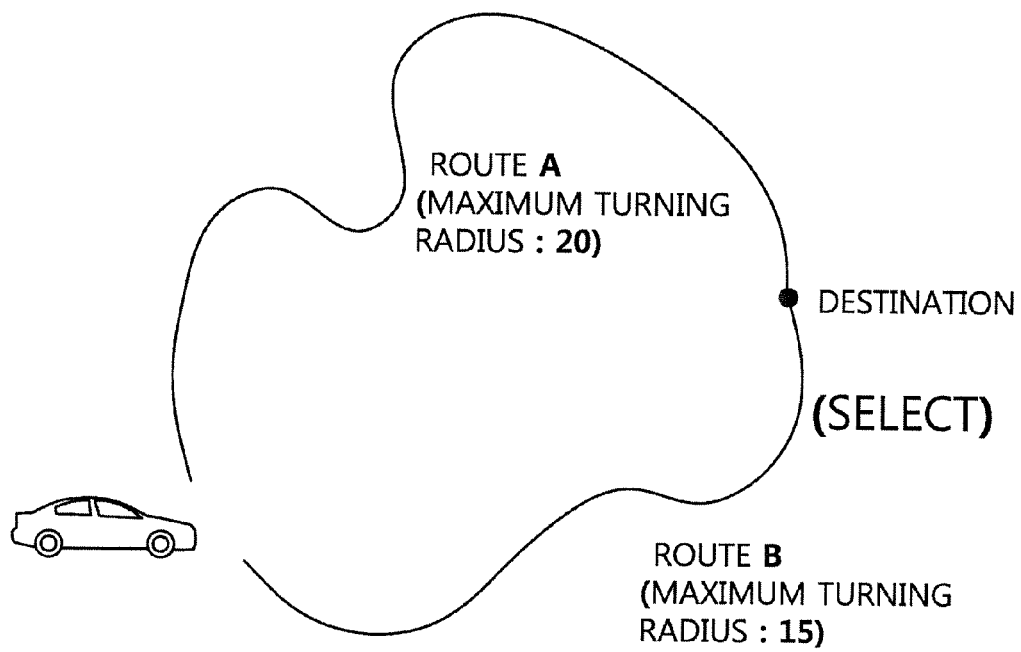
FIG. 3 is a diagram illustrating a feature that provides a route to a certain destination according to an embodiment of the present disclosure.

FIG. 3 is a diagram illustrating a feature that provides a route to a certain destination according to an embodiment of the present disclosure.

As shown in FIG. 3, routes A and B exist for the current vehicle's location to a destination and herein, the maximum turning radius value of route A is 20 and the maximum turning radius value of route B is 15. Herein, the maximum turning radius value that can be controlled by the control unit 200 is 16 when a fault is generated on a steering of a right front wheel of a vehicle.

In this case, the driving route determining unit 280 may make a final determination with route B as a route to a certain destination because a current vehicle may not control the maximum turning radius only to 16 comparing to the values. Through this, an optimal route based on a state of the current vehicle may be provided to a driver.

Further, the control unit 200 may control the turning radius while maintaining a speed of a vehicle over a threshold. This is because there may be a problem of increased danger of accident due to a surrounding vehicle when the speed of the vehicle is lowered below certain speed unnecessarily to control a vehicle turning radius.

FIG. 2 illustrates all technical features of a steering system that is applicable to an embodiment of the present description. Further, it should be understood that those skilled in the art may change and modify the present disclosure in various ways without departing from the scope of the present disclosure.

Hereinafter, the process of managing a fault by the fault management apparatus for an independently controlled steering system in a four wheel system according to an embodiment of the present disclosure is described in detail with reference to FIGS. 4 to 9.

Figure 4:
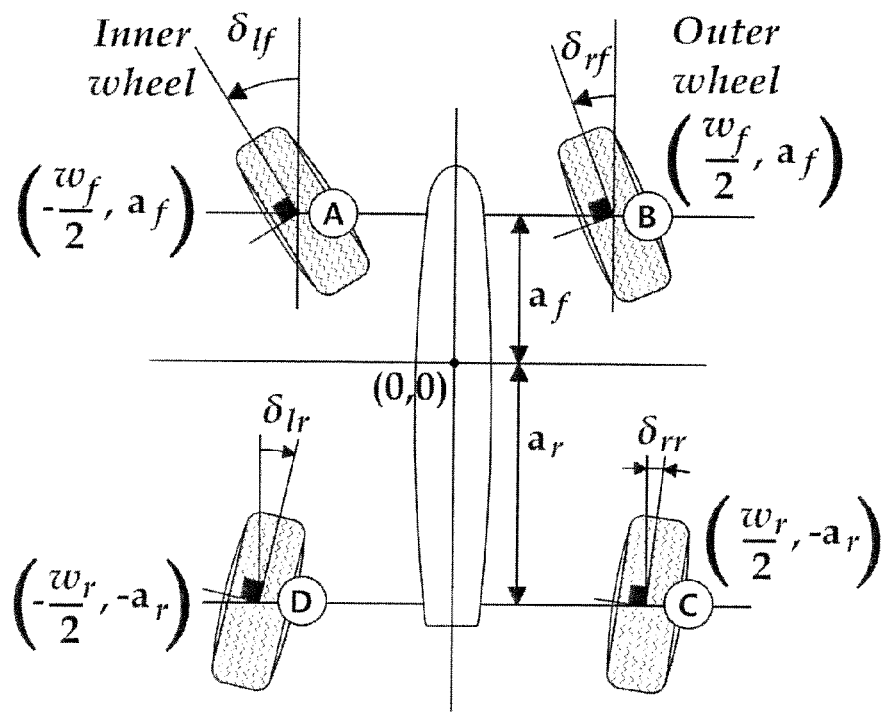
FIG. 4 is a diagram showing a rectangular coordinate system of a steering system that is used in an embodiment of the present disclosure.

Rectangular coordinate system of a steering system that is used in an embodiment of the present disclosure is described first with reference to FIG. 4. The coordinate (0, 0) is the origin of the rectangular coordinate system around a vehicle, A(−wf/2, af) is the coordinate of the left front wheel steering system, B(wf/2, af) is the coordinate of the right front wheel steering system, C(wr/2, −ar) is the coordinate of the right rear wheel steering system, D(−wr/2, −ar) is the coordinate of the left rear wheel steering system, wf is the tread of the front axle, wr is the tread of the rear axle, af is the distance between the center point and the front axle, and ar is the distance between the center point and the rear axle.

Figure 5:
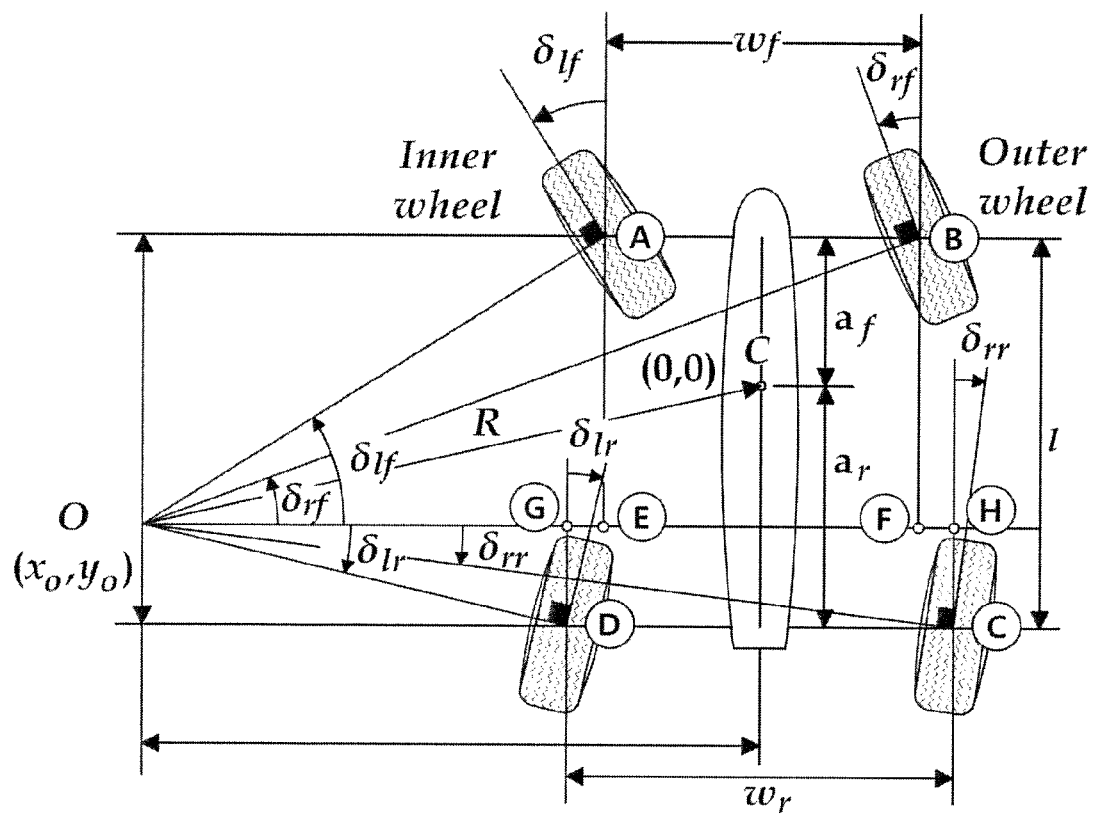
FIG. 5 is a diagram showing transverse movement of a four wheel vehicle that normally works.

Referring to FIG. 5 showing transverse movement of a four wheel steering vehicle that normally works, the four wheel steering vehicle is designed such that the tangential lines of the wheels converge on one point, and accordingly, the inscribed circles of all of the wheels make coaxial circles.

Figure 6:
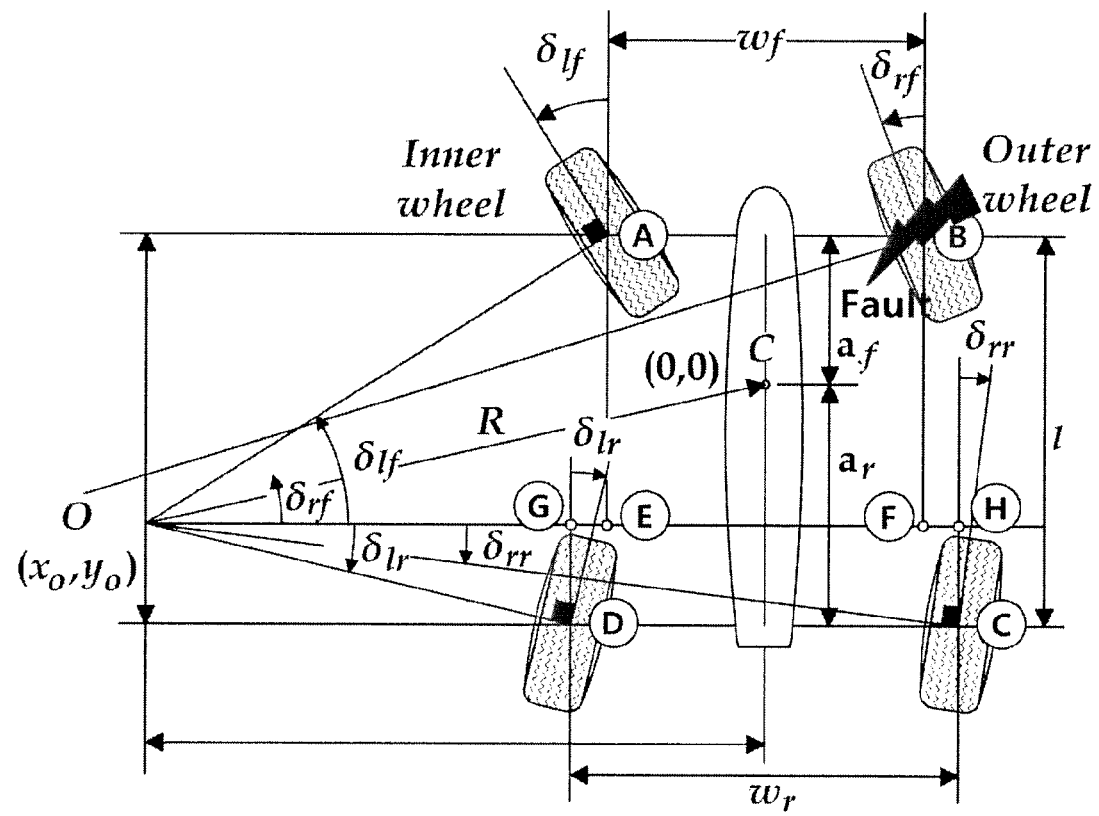
FIG. 6 is a diagram showing transverse movement of a four wheel drive vehicle with a fault in a steering system.

However, referring to FIG. 6 showing transverse movement of a four wheel steering vehicle with a fault in a steering system, when there is a fault in one or more of the steering systems operated in a four wheel steering system, the tangential lines of the wheels fail to converge on one point. Accordingly, the transverse structural safety of a vehicle which is a rigid is considerably influenced. FIG. 6 shows when the right front wheel breaks.

The fault management technology proposed by the embodiment is as follows.

Figure 7:
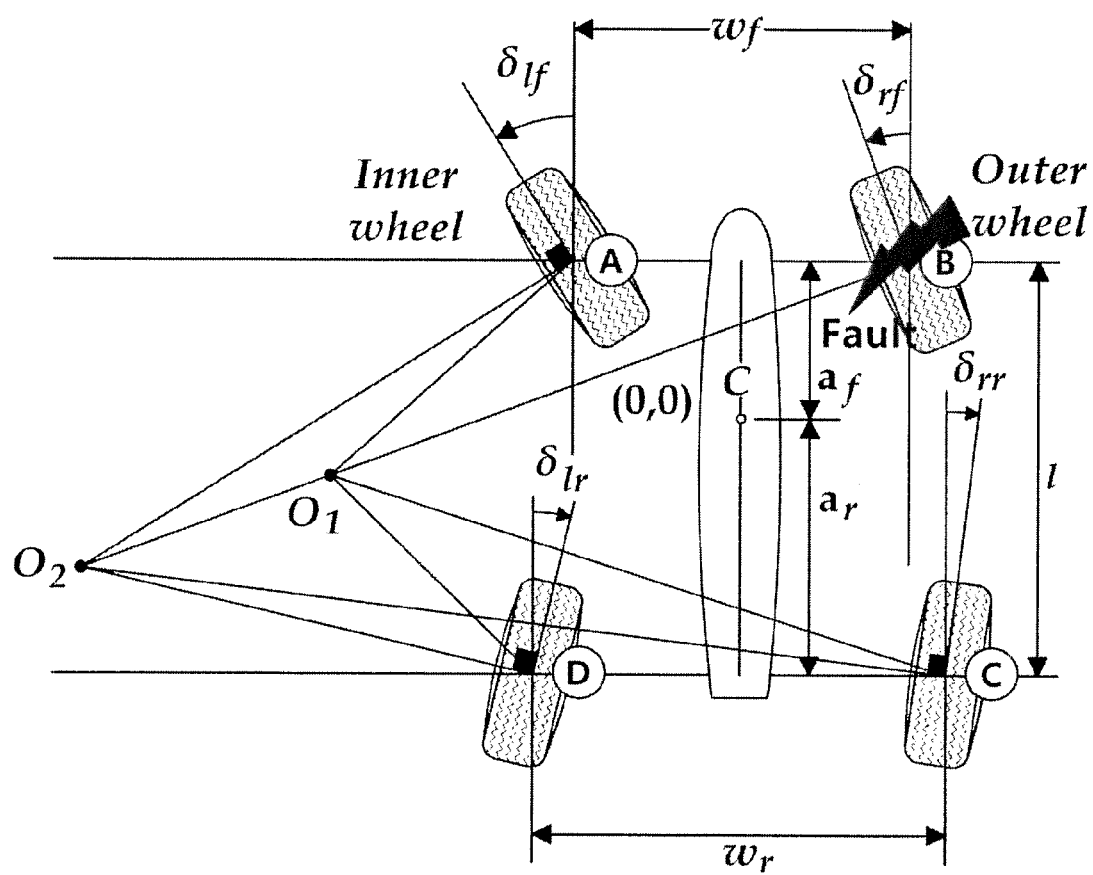
FIG. 7 is a view illustrating the basic concept of the fault management technology for a steering system in a four wheel drive vehicle.
Figure 8:
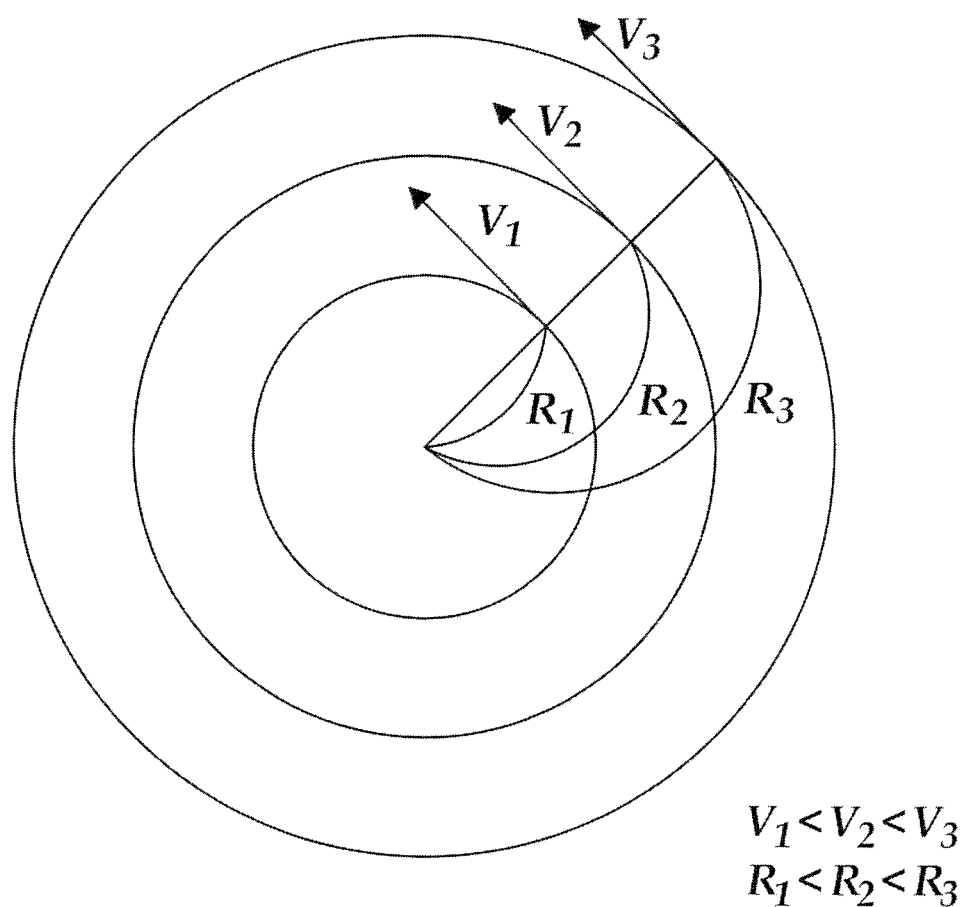
FIG. 8 is a diagram showing changes in turning radius according to the speed of a vehicle.

Referring first FIG. 7 illustrating basic concept of the fault management technology for the steering system in a four wheel drive vehicle, the tangential lines are controlled to converge on one point by adjusting the normal wheels without a fault. However, as can be seen from FIG. 7 the tangential lines of the wheels can converge on several points (O1, O2) and the turning radius of the vehicle changes in accordance with the position of the cross point. In practice, the points where the tangential lines of the wheels meet are related to the turning speed of the vehicle. That is, as shown in FIG. 8, the larger the speed of a vehicle, the larger the turning radius becomes.

Accordingly, in the embodiment, the turning radius is controlled to keep the radius before a fault is generated, by adjusting the speed of the vehicle too. That is, referring to FIG. 9 illustrating the method of correcting the turning center coordinates that converge the tangential lines of all of the wheel on one point and maintains the proper turning radius of a certain road, in accordance with an embodiment of the present disclosure, the embodiment finds a new turning center Oreconf by adjusting the steering angles of normal wheels and the speed of the vehicle.

Figure 9:
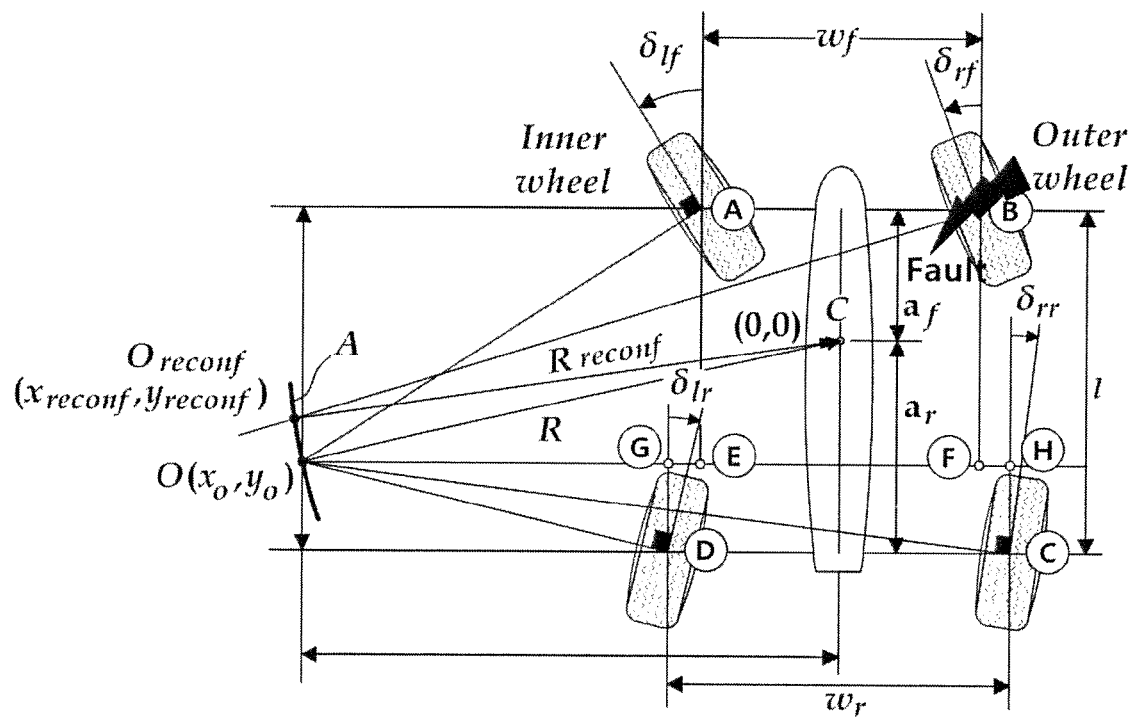
FIG. 9 is a diagram illustrating a method of correcting the coordinates of a turning center such that the tangential lines of the whole wheels converge on one point and the proper turning radius according to a surrounding road environment is maintained, according to an embodiment of the present disclosure.

The detailed operation of the embodiment is described hereafter mainly with reference to FIG. 9, for each of calculation of turning center coordinates, correction of the vehicle speed, and correction of the steering angle.

<Calculation of Turning Center Coordinates>

As shown in FIG. 6, when a fault is generated in the right front wheel steering system 140 while a vehicle travels, the turning centers of the wheels do not meet at one point. Accordingly, large stress is applied transversely to the vehicle and the safety is considerably influenced. In the embodiment, faults are managed in real time by adjusting the steering angles of the wheels that normally work and the speed of the vehicle.

Referring to FIG. 9, the point that satisfies both of the condition that the turning centers of the wheels converge on one point and the condition that the turning radius is maintained is the intersection of the tangential line with a fault and the circle having the existing turning radius, that is, when the fault is generated, as its radius. That is, such new turning center coordinates can be obtained by uniting the formulae in the following Expression 1.

$$y = \tan(\delta_{km})(x-p)+q$$

$$x^2+y^2=R'^2 \quad \text{[Expression 1]}$$

In Expression 1, $\delta km$ the steering angle of the wheel with a fault, the subscript k is a symbol for showing which one of the left wheel steering system and the right wheel steering system is the steering system with the fault, the subscript m is a symbol for showing which one of the front steering system and the rear steering system is the steering system with the fault, and p and q are the rectangular coordinates of the steering system with the fault. R' is a proper turning radius value that is determined by a fault management apparatus which may be applied with a value that changes according to a state. This is arranged as in the following Table 1 with reference to FIG. 4.

TABLE 1

| k = l, m = f | k = r, m = f | k = l, m = r | k = r, m = r |
|---|---|---|---|
| p | $-w_f/2$ | $w_f/2$ | $-w_r/2$ | $w_r/2$ |
| q | $a_f$ | $a_f$ | $-a_r$ | $-a_r$ |

In Table 1, the parameters $a_f$, $a_r$, $w_f$, and $w_r$ are defined, as in Table 2.

TABLE 2

| Symbol | Definition | Value | Unit |
|---|---|---|---|
| $a_f$ | Distance between center point and front axle | 1.40 | m |
| $a_r$ | Distance between center point and rear axle | 1.40 | m |
| $w_f$ | Tread of front axle | 1.35 | m |
| $w_r$ | Tread of rear axle | 1.40 | m |

By uniting the formulae in Expression 1, the following expression 2 that is a quadratic equation can be obtained.

$$(1+\tan^2(\delta_{km}))x^2 + 2(q\tan(\delta_{km}) - p\tan^2(\delta_{km}) + p^2\tan^2(\delta_{km}) + q^2 - R'^2 = 0 \quad [\text{Expression 2}]$$

Calculating Expression 2, the x-coordinate of a new turning center can be obtained as follow, $$x_{rec} = \frac{-b_{km} \pm \sqrt{(b_{km})^2 - 4a_{km}c_{km}}}{2a_{km}}$$

Each coefficients of the new turning center is defined as the following, $$a_{km} = 1 + \tan^2(\delta_{km})$$

$$b_{km} = 2(q\tan(\delta_{km}) - p\tan^2(\delta_{km}))$$

$$c_{km} = p^2\tan^2(\delta_{km}) - 2pq\tan(\delta_{km}) + q^2 - R'^2$$

Herein, the symbols +and −before the root are signs for right turning and left turning of a vehicle and the coefficients $a_{km}$, $b_{km}$, and $c_{km}$ can be generalized as the following Table 3.

TABLE 3

| Position of fault | $a_{km}$ | $b_{km}$ | $c_{km}$ |
|---|---|---|---|
| Front rear wheel (k = l, m = f) | $1 + \tan^2(\delta_{lf})$ | $2\alpha_f\tan(\delta_{lf}) + \omega_f\tan^2(\delta_{lf})$ | $\left(\frac{\omega_f}{2}\right)^2\tan^2(\delta_{lf}) + \alpha_f\omega_f\tan(\delta_{lf}) + (\alpha_f)^2 - R'^2$ |
| Right front wheel (k = r, m = f) | $1 + \tan^2(\delta_{rf})$ | $2\alpha_f\tan(\delta_{rf}) - \omega_f\tan^2(\delta_{rf})$ | $\left(\frac{\omega_f}{2}\right)^2\tan^2(\delta_{rf}) + \alpha_f\omega_f\tan(\delta_{rf}) + (\alpha_f)^2 - R'^2$ |
| Left rear wheel (k = l, m = r) | $1 + \tan^2(\delta_{lr})$ | $-2\alpha_r\tan(\delta_{lr}) + \omega_r\tan^2(\delta_{lr})$ | $\left(\frac{\omega_f}{2}\right)^2\tan^2(\delta_{lr}) + \alpha_r\omega_r\tan(\delta_{lr}) + (\alpha_r)^2 - R'^2$ |
| Right rear wheel (k = r, m = r) | $1 + \tan^2(\delta_{rr})$ | $-2\alpha_r\tan(\delta_{rr}) - \omega_r\tan^2(\delta_{rr})$ | $\left(\frac{\omega_f}{2}\right)^2\tan^2(\delta_{rr}) + \alpha_r\omega_r\tan(\delta_{rr}) + (\alpha_r)^2 - R'^2$ |

In Table 3, the subscript k of the coefficient a, b, and c means the left (l) or the right (r) and the subscript m means the front (f) or the rear (r).

Further, substituting $x_{rec}$ that is the x-coordinate of the calculated turning center, the y-coordinate $y_{rec}$ of the new turning center for fault management is as follow.

$$y_{rec} = \tan(\delta_{km})(x_{rec}-p)+q \quad y_{rec} = \tan(\delta_{km})(x_{rec}-p)+q$$

The y-coordinate of the turning center can be generalized, as in the following Table 4, in accordance with the position of a fault

TABLE 4

| | k = l | k = r |
|---|---|---|
| m = f | $\tan(\delta_{lf})\left(x_{rec} + \frac{\omega_f}{2}\right) + \alpha_f$ | $\tan(\delta_{rf})\left(x_{rec} + \frac{\omega_f}{2}\right) + \alpha_f$ |
| m = r | $\tan(\delta_{lr})\left(x_{rec} + \frac{\omega_r}{2}\right) - \alpha_r$ | $\tan(\delta_{rr})\left(x_{rec} + \frac{\omega_r}{2}\right) - \alpha_r$ |

<Correction of Vehicle Speed>

On the basis of the coordinate ($x_{rec}$, $y_{rec}$) of the new turning center, a corrected speed of a vehicle for keeping the proper turning radius is calculated by the following Expression 3.

$$V_r = R'\delta_o, \quad \delta_o = \arctan\left(\frac{y_{rec}}{x_{rec}}\right) \quad [\text{Expression 3}]$$

In Expression 3, $V_r$ is a corrected speed of a vehicle, R' is the turning radius when a fault is generated, $\delta_o$ is the movement direction angular speed of the vehicle, $X_{rec}$ is the x-coordinate of the turning center calculated by Expression 1, and $y_{rec}$ is the y-coordinate of the turning center calculated by Expression 1. The speed calculating unit 230 of the embodiment calculates a speed for keeping the proper turning radius when the fault is generated, through Expression 3.

<Correction of Steering Angle>

On the basis of the coordinate ($x_{rec}$, $y_{rec}$) of the new turning center, a corrected steering angle reconfigured for managing a fault can be calculated by the following Expression 4.

$$\delta_{km} = \arctan\left(\frac{y_{rec} - q}{x_{rec} - p}\right) \quad \text{[Expression 4]}$$

In Expression 4, the point (p, q) is the rectangular coordinate of a steering system that normally works and the coordinate values follow Table 1.

Accordingly, Expression 4 can be expressed as in the following Table 5, from Tables 1,3 , and 4.

TABLE 5

Corrected steering angel for managing fault

|  |  | k = l, m = f | k = r, m = f | k = l, m = r | k = r, m = r |
|---|---|---|---|---|---|
| Steering system with fault | k = l, m = f | fault | $\arctan\left(\frac{y_{rec} - a_f}{x_{rec} - w_f/2}\right)$ | $\arctan\left(\frac{y_{rec} + a_r}{x_{rec} + w_r/2}\right)$ | $\arctan\left(\frac{y_r + a_f}{x_r - w_r/2}\right)$ |
| 장빌 생조 향시 스템 | k = r, m = f | $\arctan\left(\frac{y_{rec} - a_f}{x_{rec} + w_f/2}\right)$ | fault | $\arctan\left(\frac{y_{rec} + a_r}{x_{rec} + w_r/2}\right)$ | $\arctan\left(\frac{y_r + a_r}{x_r - w_r/2}\right)$ |
|  | k = l, m = r | $\arctan\left(\frac{y_{rec} - a_f}{x_{rec} + w_f/2}\right)$ | $\arctan\left(\frac{y_{rec} - a_f}{x_{rec} - w_f/2}\right)$ | fault | $\arctan\left(\frac{y_r + a_r}{x_r - w_r/2}\right)$ |
|  | k = r, m = r | $\arctan\left(\frac{y_{rec} - a_f}{x_{rec} + w_f/2}\right)$ | $\arctan\left(\frac{y_{rec} - a_f}{x_{rec} - w_f/2}\right)$ | $\arctan\left(\frac{y_{rec} + a_r}{x_{rec} + w_r/2}\right)$ | fault |

According to Table 5, when the right front wheel steering system breaks, the corrected steering angle for managing the fault has only to follow the column of k=r and m=f in Table 5.

That is, the steering angle calculating unit 240 of the embodiment calculates the steering angle $\delta_{rf}$ of the right front wheel steering system 140 from $$\arctan\left(\frac{y_{rec} - \alpha_f}{x_{rec} - w_f/2}\right)$$

and the steering angle $\delta_{lr}$ of the left rear wheel steering system 160 from $$\arctan\left(\frac{y_{rec} - \alpha_r}{x_{rec} - w_r/2}\right),$$

and the steering angle $\delta_{rr}$ of the right rear wheel steering system 180 from $$\arctan\left(\frac{y_{rec} - \alpha_r}{x_{rec} - w_r/2}\right),$$

1) when there is a fault in the left front steering system, calculates the steering angle $\delta_{lf}$ of the left front wheel steering system 120 from $$\arctan\left(\frac{y_{rec} - \alpha_f}{x_{rec} - w_f/2}\right),$$

the steering angle $\delta_{lr}$ of the left rear wheel steering system 160 from $$\arctan\left(\frac{y_{rec} - \alpha_r}{x_{rec} - w_r/2}\right),$$

and the steering angle $\delta_{rr}$ of the right rear wheel steering system 180 from $$\arctan\left(\frac{y_{rec} - \alpha_r}{x_{rec} - w_r/2}\right),$$

2) when there is a fault in the right front steering system, calculates the steering angle $\delta_{lf}$ of the left front wheel steering system 120 from $$\arctan\left(\frac{y_{rec} - \alpha_f}{x_{rec} - w_f/2}\right),$$

the steering angle $\delta_{rf}$ of the right front wheel steering system 140 from $$\arctan\left(\frac{y_{rec} - \alpha_f}{x_{rec} - w_f/2}\right),$$

and the steering angle $\delta_{rr}$ of the right rear wheel steering system 180 from $$\arctan\left(\frac{y_{rec} - \alpha_r}{x_{rec} - w_r/2}\right),$$

3) when there is a fault in the left rear steering system, and calculates the steering angle $\delta_{lf}$ of the left front wheel steering system 120 from $$\arctan\left(\frac{y_{rec} - \alpha_f}{x_{rec} - w_f/2}\right),$$

the steering angle $\delta_{rf}$ of the right front wheel steering system 140 from $$\arctan\left(\frac{y_{rec} - \alpha_f}{x_{rec} - w_f/2}\right),$$

and the steering angle $\delta_{lr}$ of the left rear wheel steering system 16 from $$\arctan\left(\frac{y_{rec} - \alpha_r}{x_{rec} - w_r/2}\right),$$

4) when there is a fault in the right rear steering system.

A simulation result on the fault management apparatus for an independently controlled steering system in a four wheel drive system according to an embodiment of the present invention is described hereafter.

First, the assumption for the simulation is as follows.

The performance of the right front wheel decreases by 20% (($\delta$: 14.3887°→11.511°, the speed of the vehicle when a fault is generated is 24.4412 km/h, the coordinate of the turning center is (−31.045, −6.7376), and the turning radius is 31.7678 m. The parameters of the vehicle are as defined in Table 1. The proper turning radius of a vehicle is defined as a value that is same with a turning radius of the current vehicle.

The following Table 6 shows changed correction and corrected steering angle of the wheel in the vehicle for managing a fault, and the turning center coordinate and the turning radius changed after the fault is managed.

TABLE 6

|  | Before fault | After managing fault |
|---|---|---|
| $\delta_{rf}$ | 15 | 6.9185 |

In table 6, it can be seen that after the fault is managed, the turning center of the vehicle moved about −30 cm on the x axis and about 1.6 m on the y axis and the speed of the vehicle reduced by about 6 km/h. It can be seen that the turning radius is kept due to the decrease in vehicle speed.

FIGS. 10 to 15 show the simulation results on movement of a vehicle turning.

Figure 10:
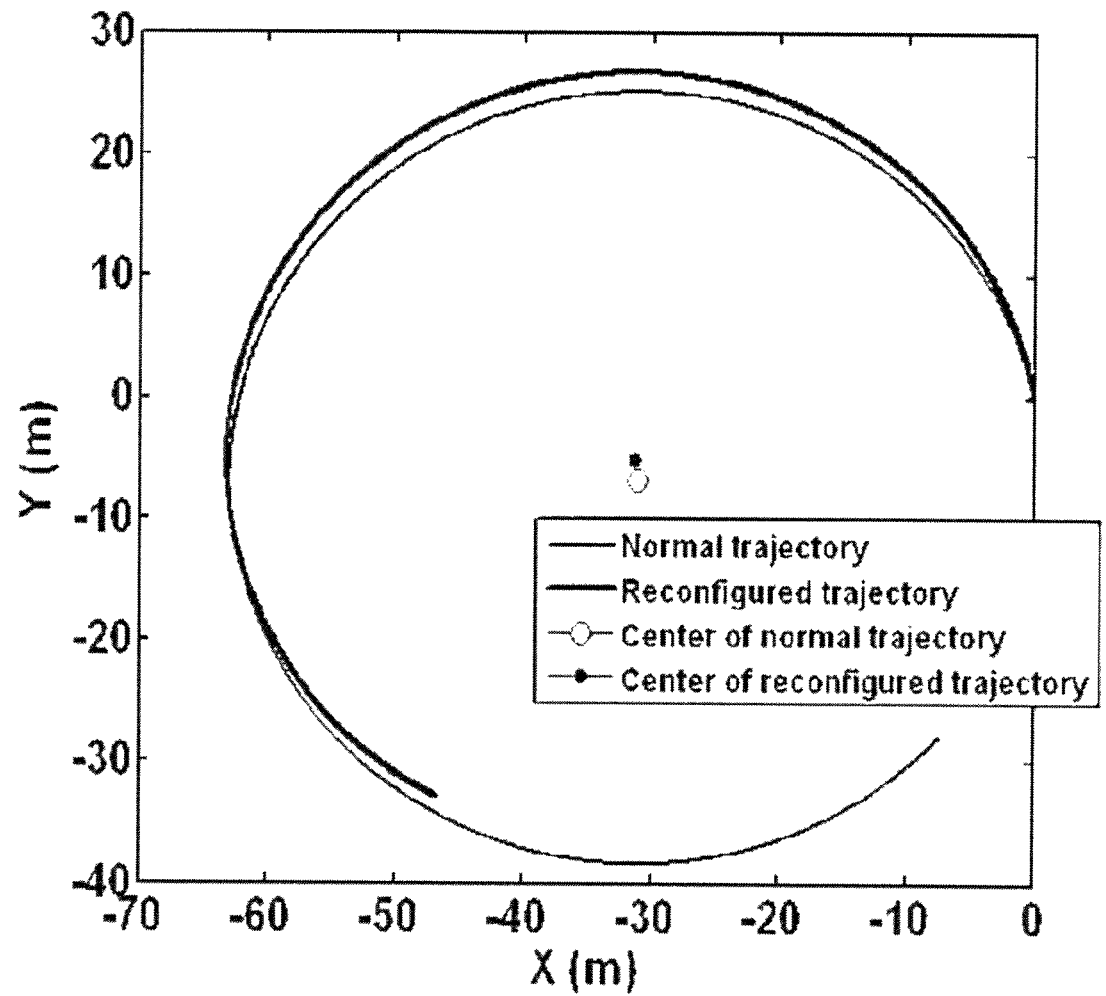
FIG. 10 is a diagram comparing the trajectories and the turning centers of a vehicle, when it is in a normal state without a fault and when fault management is performed.
Figure 11:
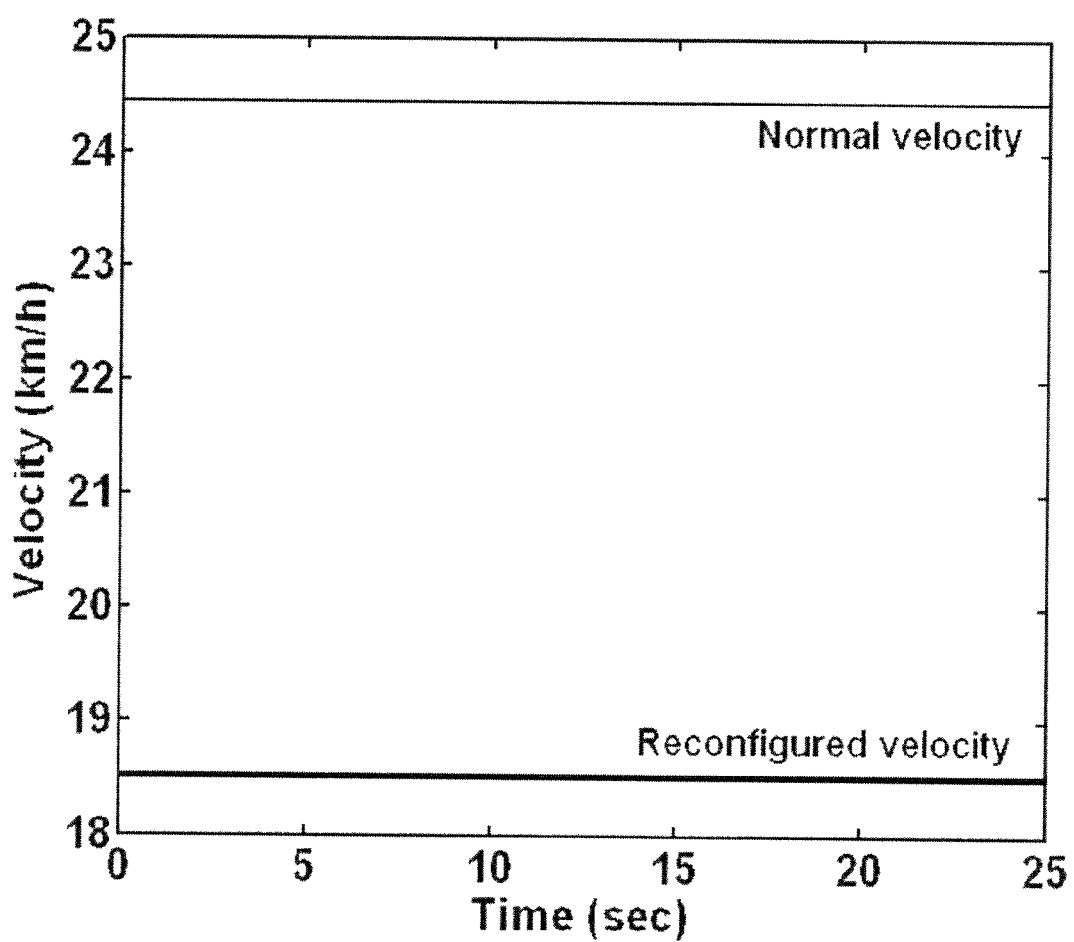
FIG. 11 is a diagram comparing the speeds of a vehicle, when it is in a normal state without a fault and when fault management is performed.

First, FIG. 10 shows the trajectories of a normal vehicle and a vehicle with a fault managed and the turning centers according to the trajectories. FIG. 11 shows the result that the speed of a vehicle decreases to keep the proper turning radius after a fault is managed. Referring to FIGS. 10 and 11, it can be seen that the speed of the vehicle reduced by about 6 km/h and the movement distance of the vehicle decreased.

Figure 12:
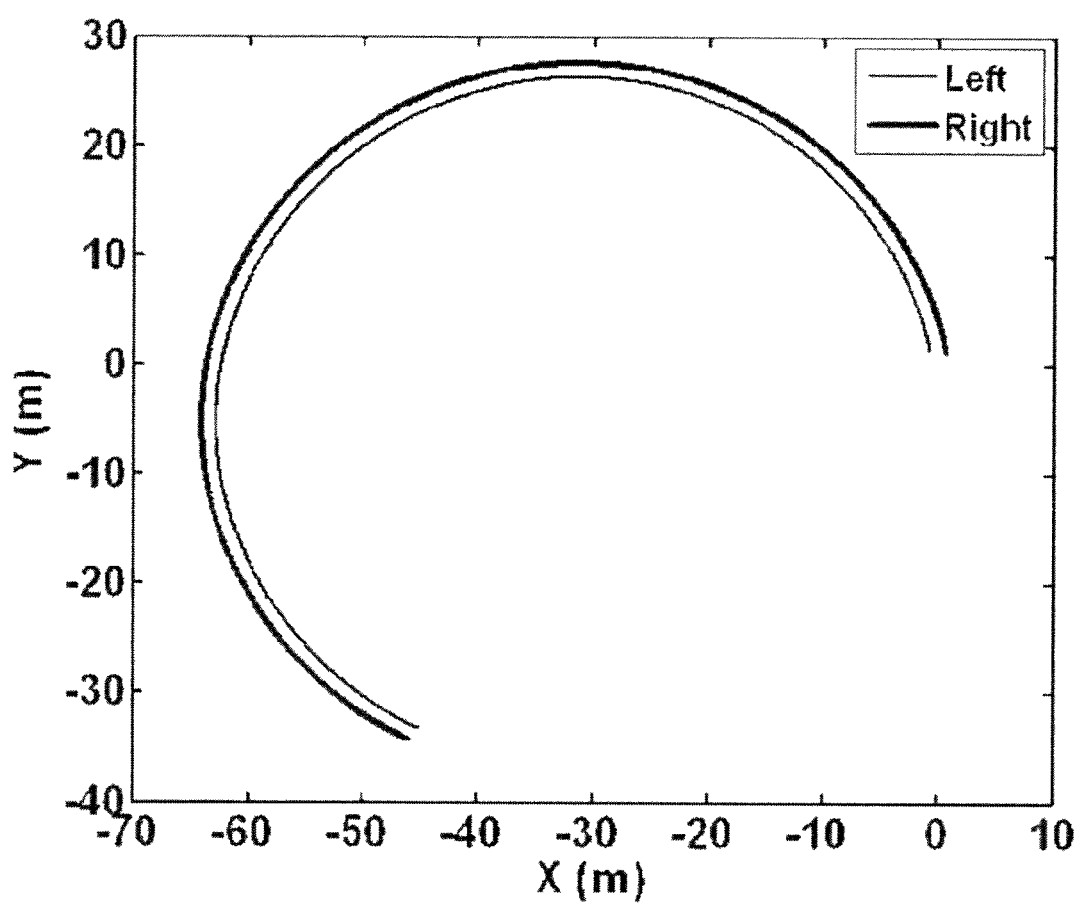
FIG. 12 is a diagram showing the trajectory of front wheels after fault management in accordance with the embodiment.
Figure 13:
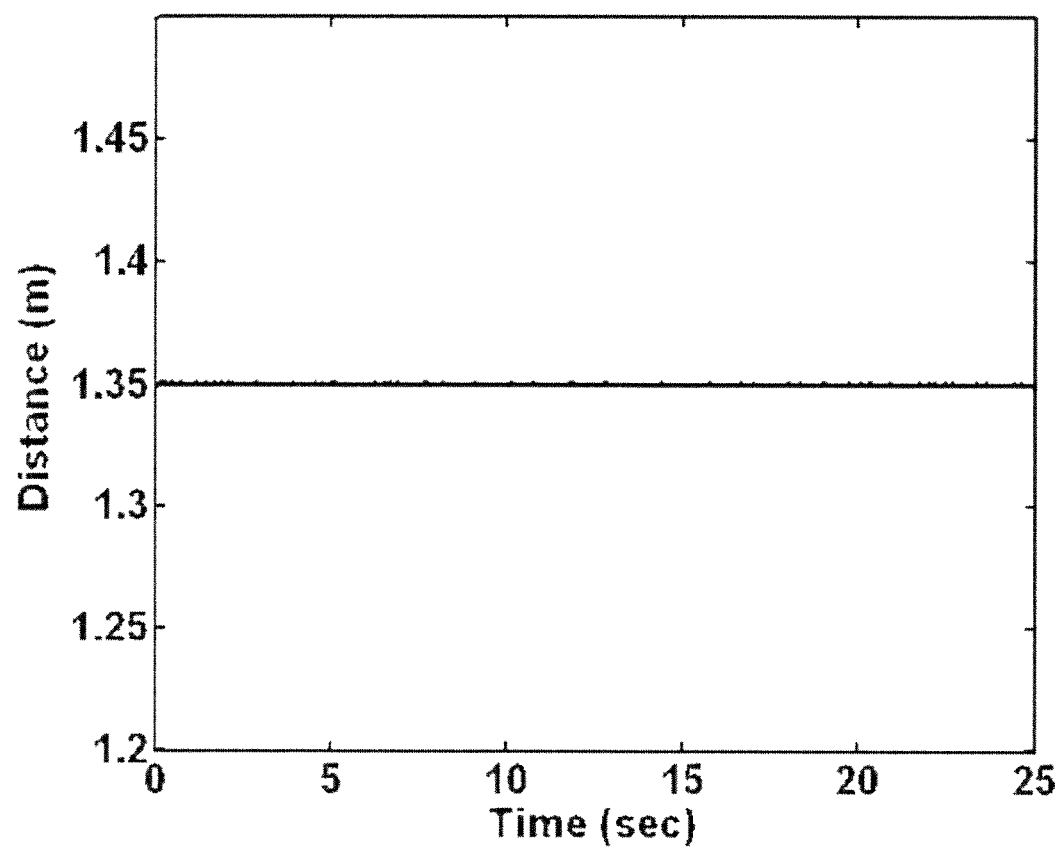
FIG. 13 is a diagram showing the distance between front wheels after fault management in accordance with the embodiment.
Figure 14:
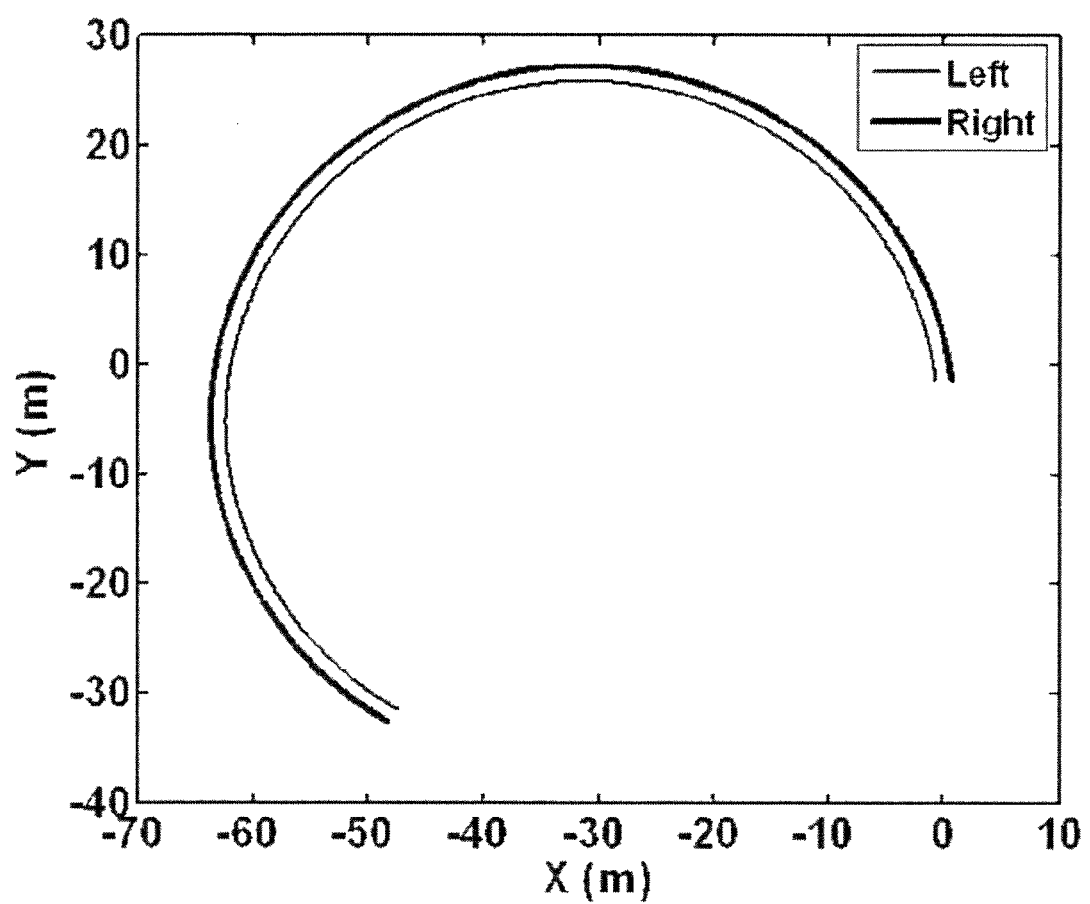
FIG. 14 is a diagram showing the trajectory of rear wheels after fault management in accordance with the embodiment.
Figure 15:
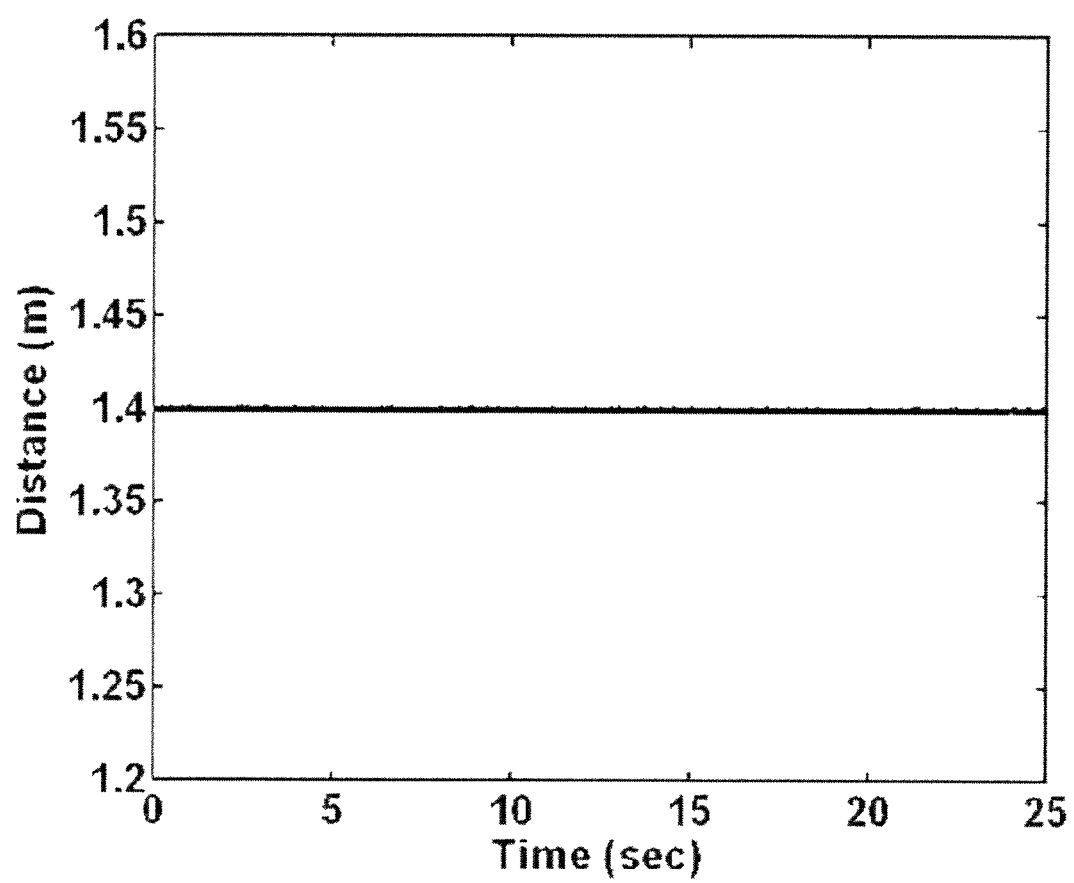
FIG. 15 is a diagram showing the distance between rear wheels after fault management in accordance with the embodiment.

FIGS. 12 and 13 show the turning trajectories of the left and right front wheels and the distance between the wheels. Further, FIGS. 14 and 15 show the turning trajectories of the left and right rear wheels and the distance between the wheels. Referring to FIGS. 12 to 15, as the result of adjusting steering input, using the fault management technology proposed in the embodiment, it can be seen that the transverse safety of the vehicle is ensured by maintaining the front width wf, that is, the tread of the front axle and the rear width wr, that is, the tread of the rear axle.

As described in detail above, according to the present disclosure, when there is a fault in one or more wheels of a four wheel vehicle, it is possible to stabilize the vehicle body by actively adjusting the steering angles of the wheels that normally work and the speed of the vehicle in accordance with the fault environment.

Further, a vehicle route based on a route that is possible of adoptively driving in a fault environment of a current vehicle may be provided when providing a vehicle route to a certain destination.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A fault tolerant apparatus for an independent controlled steering in a four wheel steering system comprising:
  a steering system unit that is disposed at four wheels of a vehicle, controls steering angle of the wheels, and collects and transmits the state information of the wheels; and
  a control unit that controls the turning radius of the vehicle in accordance with the state information transmitted from the steering system unit,
  wherein the control unit controls the turning radius of the vehicle by controlling a steering angle of the others wheel with no fault generated and a speed of the vehicle when a fault information is included in the state information transmitted by the steering system unit according to the following table and equation:

|  |  | Corrected steering angle for managing fault | |
|---|---|---|---|
|  |  | k = l, m = f | k = r, m = f |
| Steering system with fault | k = l, m = f | fault | $\arctan\left(\frac{y_{rec} - a_f}{x_{rec} - w_f/2}\right)$ |
|  | k = r, m = f | $\arctan\left(\frac{y_{rec} - a_f}{x_{rec} + w_f/2}\right)$ | fault |
|  | k = l, m = r | $\arctan\left(\frac{y_{rec} - a_f}{x_{rec} + w_f/2}\right)$ | $\arctan\left(\frac{y_{rec} - a_f}{x_{rec} - w_f/2}\right)$ |
|  | k = r, m = r | $\arctan\left(\frac{y_{rec} - a_f}{x_{rec} + w_f/2}\right)$ | $\arctan\left(\frac{y_{rec} - a_f}{x_{rec} - w_f/2}\right)$ |

|  |  | Corrected steering angle for managing fault | |
|---|---|---|---|
|  |  | k = l, m = r | k = r, m = r |
| Steering system with fault | k = l, m = f | $\arctan\left(\frac{y_{rec} - a_r}{x_{rec} + w_r/2}\right)$ | $\arctan\left(\frac{y_r + a_r}{x_r - w_r/2}\right)$ |
|  | k = r, m = f | $\arctan\left(\frac{y_{rec} - a_r}{x_{rec} + w_r/2}\right)$ | $\arctan\left(\frac{y_r + a_r}{x_r - w_r/2}\right)$ |
|  | k = l, m = r | fault | $\arctan\left(\frac{y_r + a_r}{x_r - w_r/2}\right)$ |

-continued

| | | |
|---|---|---|
| k = r,<br>m = r | $\arctan\left(\dfrac{y_{rec} - a_r}{x_{rec} + w_r/2}\right)$ | fault | wherein wf is the tread of the front axle, wr is the tread of the rear axle, af is the distance between the center point and the front axle, ar is the distance between the center point and the rear axle, xrec is the x-coordinate of the new turning center, yrec is the y-coordinate of the new turning center and subscript k means the left (l) or the right (r) and the subscript m means the front (f) or the rear (r))

[Expression]

$$R' = \frac{Vr}{\delta o}$$

wherein $V_r$ is a corrected speed of a vehicle, R' is the turning radius when a fault is generated, $\delta_o$ is the movement direction angular speed of the vehicle.

2. The fault tolerant apparatus for an independent controlled steering in a four wheel steering system of claim 1, wherein the control unit includes:
a turning radius determining unit that determines a proper turning radius of the vehicle, when a fault information is included in the state information that is transmitted by the steering system unit;
a rotating center coordinate calculating unit that calculates rotating center coordinates such that the tangential lines of all of the wheels converge on one point and the turning radius when a fault is generated are maintained, when fault information is included in the state information transmitted from the steering system unit;
a speed calculating unit that calculates a speed for keeping the turning radius when a fault is generated on the basis of the rotating center coordinates calculated by the rotating center coordinate calculating unit;
a steering angle calculating unit that calculates the steering angles of steering systems without a fault on the basis of the turning center coordinates calculated by the turning center coordinate calculating unit; and
a speed/steering angel control unit that controls the steering angle and the speed of the vehicle by transmitting the steering angles calculated by the steering angle calculating unit to the steering systems without a fault and transmitting the speed calculated by the speed calculating unit to an engine control unit.

3. The fault tolerant apparatus for an independent controlled steering in a four wheel steering system of claim 1, wherein the control unit controls the turning radius while maintaining the vehicle speed over a threshold.

4. The fault tolerant apparatus for an independent controlled steering in a four wheel steering system of claim 1, further comprising:
a maximum turning radius information acquiring unit that acquires a maximum turning radius of the road that the vehicle is driving, and
wherein the control unit controls the turning radius of the vehicle under the maximum turning radius.

5. The fault tolerant apparatus for an independent controlled steering in a four wheel steering system of claim 1, further comprising:
a proper turning radius information acquiring unit that acquires a proper turning radius regarding the road that the vehicle is driving, and
wherein the control unit controls the vehicle turning radius with the proper turning radius.

6. The fault tolerant apparatus for an independent controlled steering in a four wheel steering system of claim 1, the control unit further comprising:
a maximum turning radius acquiring unit that acquires a maximum turning radius for at least one route to a certain destination; and
a driving route determining unit that determines a driving route to a certain destination by comparing a maximum turning radius value that is controllable by the control unit with a maximum turning radius of each routes.

7. The fault tolerant apparatus for an independent controlled steering in a four wheel steering system of claim 6, wherein the maximum turning radius acquiring unit comprising:
a candidate route determining unit that determines at least one route to a certain destination based on a current vehicle location information, and
a maximum turning radius acquiring unit for each routes that acquires a maximum turning radius for each routes using a maximum turning radius value of at least one road that is included in respective routes that is acquired from an specific road information database.

8. The fault tolerant apparatus for an independent controlled steering in a four wheel steering system of claim 1, wherein the control unit is formed with an Electronic Control Unit (ECU) or a specific independent module.

\* \* \* \* \*